United States Patent [19]

Chainer et al.

[11] Patent Number: 4,562,592
[45] Date of Patent: Dec. 31, 1985

[54] SHIFTING TECHNIQUE FOR SIGNATURE VERIFICATION

[75] Inventors: Timothy J. Chainer, Mahopac; Thomas K. Worthington, South Salem, both of N.Y.

[73] Assignee: International Business Machines Corporation, Armonk, N.Y.

[21] Appl. No.: 567,201

[22] Filed: Dec. 30, 1983

[51] Int. Cl.⁴ .............................................. G06K 9/22
[52] U.S. Cl. ......................................... 382/3; 382/59
[58] Field of Search .............................. 382/3, 13, 59

[56] References Cited

U.S. PATENT DOCUMENTS 3,983,535  9/1976  Herbst et al. ............................ 382/3

Primary Examiner—Leo H. Boudreau
Assistant Examiner—Michael M. Murray
Attorney, Agent, or Firm—Roy R. Schlemmer

[57] ABSTRACT

A signature verification system includes means for obtaining acceleration data and pressure data related to a given signature and means for comparing that data with reference data previously obtained from an identified signer. The correlations between segments of a reference pressure signal and a sample pressure signal are computed. This process involves successively measuring the correlation as the two segments are shifted with respect to each other. The amount of the shifts that produce the maximum correlations between the pressure signal segments is stored in memory, and these shift values are utilized to determine the correlations of respective pairs of segments of the acceleration data. Since the acceleration data is not independently shifted in computing the correlations, substantial processing time is saved. In addition, the overall performance of the signature verification system is improved both in terms of processing time and in error rate as compared to the prior system.

3 Claims, 4 Drawing Figures

SHIFTING TECHNIQUE FOR SIGNATURE VERIFICATION

FIELD OF THE INVENTION

The present invention relates generally to the field of signature verification for authenticating the signer of a document, and more particularly to an improved shifting technique used in the verification procedure which reduces the number of multiplications necessary to perform the overall correlation and improves performance as measured by the system error rates.

BACKGROUND OF THE INVENTION

There has always been a need in society for verifying a person's identity for a variety of purposes. Modern day scientific technology has adopted the widespread use of computers and related mechanisms for the purposes of giving credit, performing electronic funds transfer, and so forth. In all facets of the financial community including the retail industry, securities industry, banking and the like, sums of money, securities and/or materials are transferred between owners based on the reliance of one person on the purported identity of another. Electronic systems including various cryptographic instrumentalities together with secret identity numbers or keys provide a certain amount of security; however, the amount of security is predicated upon the degree of secrecy with which one is able to secure his own special identification key. Obviously, once a person's key is learned by another, presumably an unauthorized person, the other person may falsely assume his identity for a wide variety of electronic applications.

Identity verification by means of written signatures has long been known in the art; however, most known systems have various shortcomings. Simply matching the appearance of two signatures is not satisfactory as expert forgers can usually duplicate the appearance of a person's signature as well as the person himself. The result of this is that when an expert forger is involved, even expert document examiners are frequently unable to discover that the signature is forged.

Recent developments in the field of automatic signature verification such as exemplified by U.S. Pat. No. 3,983,535 of Herbst et al and U.S. Pat. No. 4,128,829 of Herbst et al make the concept of personal identification via computer based signature analysis practical. The invention disclosed in U.S. Pat. No. 3,983,535 is based on the discovery that the accelerations of the stylus, which are proportional to the muscle forces exerted by the signer, are of predetermined consistent durations when forming particular strokes in a habitual signature. The nature of the process gives rise to various distortions in the time axis; e.g. pauses between sections of the name, skipped strokes, decorative rubrics, and the like. Thus, the signal is marked by regions of high correlation of unknown duration separated by variable regions of low correlation. Accordingly, the invention in U.S. Pat. No. 3,983,535 dealt with a method of regional correlation which registered these regions based initially on stylus contact and then shifting the regions individually to find the maximal of the correlation function weighted to penalize shifting. The results were then combined to make an overall verification decision.

The signature verification method disclosed in U.S. Pat. No. 3,983,535 was based on a single acceleration parameter of the signature dynamic, but as disclosed in U.S. Pat. No. 4,128,829, an even greater discrimination in the verification operation is possible using two orthogonally disposed (e.g. X and Y axes) acceleration components together with the pressure patterns which are produced during the writing of the signature and utilizing all three of these individual parameters in the correlation operation. The invention disclosed in U.S. Pat. No. 4,128,829 retained the concept of segmenting the sample and reference signatures, correlating individual segment pairs utilizing a series of successive shifts to obtain the maximum possible correlation, weighting the correlations, and finally combining the individual correlation statistics for all segments. An example of a pen that may be used in the Herbst et al verification system is disclosed in U.S. Pat. No. 4,142,175 of Herbst et al. This pen produces electical signals proportional to accelerations in the X and Y axes and an electrical signal proportional to the pen point pressure along the Z axis.

According to the Herbst et al procedure, reference acceleration and pressure signals are stored in memory in the electronic computer. Actually, as will be understood by those skilled in the art, digital representations of the acceleration and pressure signals are stored, and the acceleration and pressure signals produced by the pen when used to write a signature are also digitized so that all the arithemetical processing is performed digitally. In a typical system, when a customer opens an account, a signature acquisition feature on a computer terminal prompts the customer to sign his or her name several times. This produces signature data that is transmitted to the computer which selects the reference signals that are stored. Both the reference signals and the signals from the pen produced by a person whose signature is to be verified are segmented as a function of pen lifts which are detected by the pressure signal becoming zero. Pen lifts are critical to good correlation scores as they represent reproducible timing marks in the signature. The segmented acceleration and pressure signals from the pen are then compared with the corresponding reference acceleration and pressure signal segments using the correlation algorithm disclosed in U.S. Pat. No. 3,983,535 of Herbst et al. This correlation algorithm involves shifting the acceleration and pressure signal segments with respect to their corresponding reference segments in order to achieve maximum correlation. This process is carried out independently for each of the acceleration and pressure segments and results in a very high recognition ratio. However, since the correlation function is approximated by the summation of a plurality of products, the procedure can be very time consuming and resulting in delays which can be annoying to customers whose signatures are being verified. This problem can be overcome by using parallel, pipelined processors, but this is expensive.

SUMMARY OF THE INVENTION

It is therefore an object of the present invention to provide an improved technique for correlating the acceleration and pressure signals in a signature verification system.

It is another object of the invention to provide an improved signature verification system which is both fast and relatively inexpensive.

The foregoing and other objects of the invention are accomplished by a shifting technique that reduces the number of multiplications necessary to perform the overall correlation by a factor of four. According to the present invention, the pressure signal shift is determined as before but instead of independently shifting the acceleration signal for maximum correlation, the pressure signal shift is used as the shift for the acceleration signal shift. This procedure significantly reduces the computation time and improves performance as measured by the system error rates.

BRIEF DESCRIPTION OF THE DRAWINGS

The foregoing and other objects, aspects and advantages of the invention will be better understood from the following detailed description with reference to the accompanying drawings, in which.

DETAILED DESCRIPTION OF THE PREFERRED EMBODIMENT OF THE INVENTION

The present invention is practiced using the basic algorithm in the above referenced U.S. Pat. No. 3,983,535 of Herbst et al which is incorporated herein by reference. According to that algorithm, a d.c. pressure signal is measured and periods of zero pressure are detected to determine pen lifts and thereby segment the acceleration and pressure signals. The basic algorithm may be modified by using the segmentation technique disclosed in application Ser. No. 567,200 filed concurrently herewith by Chainer et al, entitled "An Improved Segmentation Algorithm for Signature Verification" and assigned to the assignee of this application. In the Worthington et al application a signal is produced which is representative of the first time derivative of pressure forces. In either case, the basic Herbst et al verification technique involves segmenting the acceleration and pressure signals which were produced by a known person when writing his or her signature and stored as reference signals. Then, at a later time, a person whose signature is to be verified writes his or her signature to produce acceleration and pressure signals which are segmented and compared to the reference signals. The process of comparing involves individually shifting the members of each corresponding segment pair relative to one another in order to achieve the maximum correlation of each corresponding segment pair. A running account of the maximum cross correlation values for all the segment pairs of the two signatures are kept, and these maximum values are combined to produce a resultant correlation value that is utilized as a verification indication.

Figure 1A:
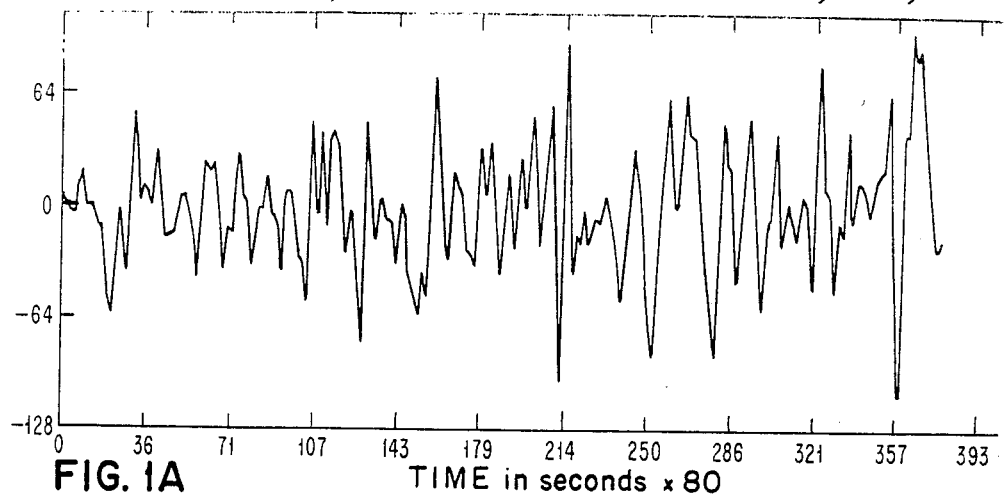
FIGS. 1A, 1B and 1C are oscillographs of specimen acceleration and pressure signals which are typical of those produced by a pen in a signature verification system.
Figure 1B:
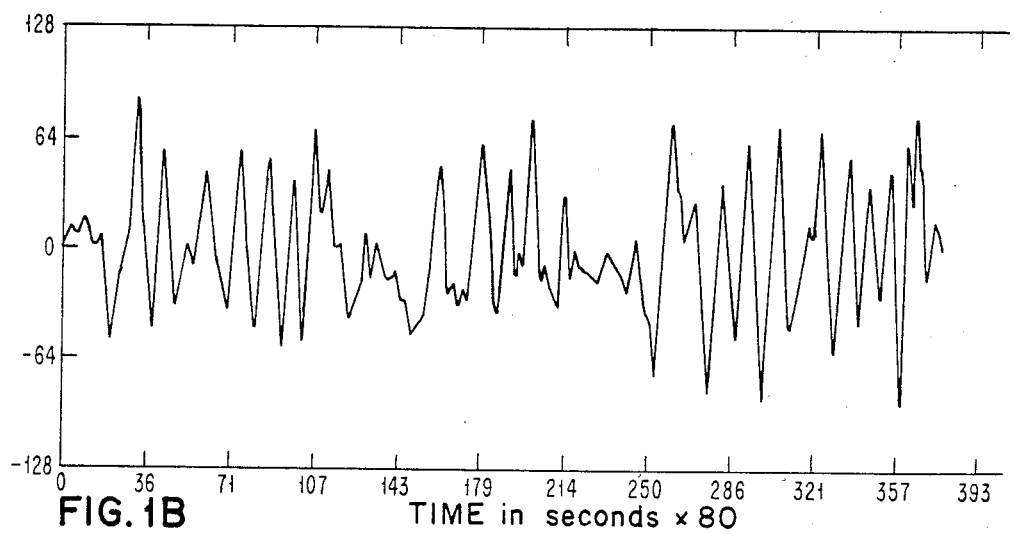
Figure 1C:
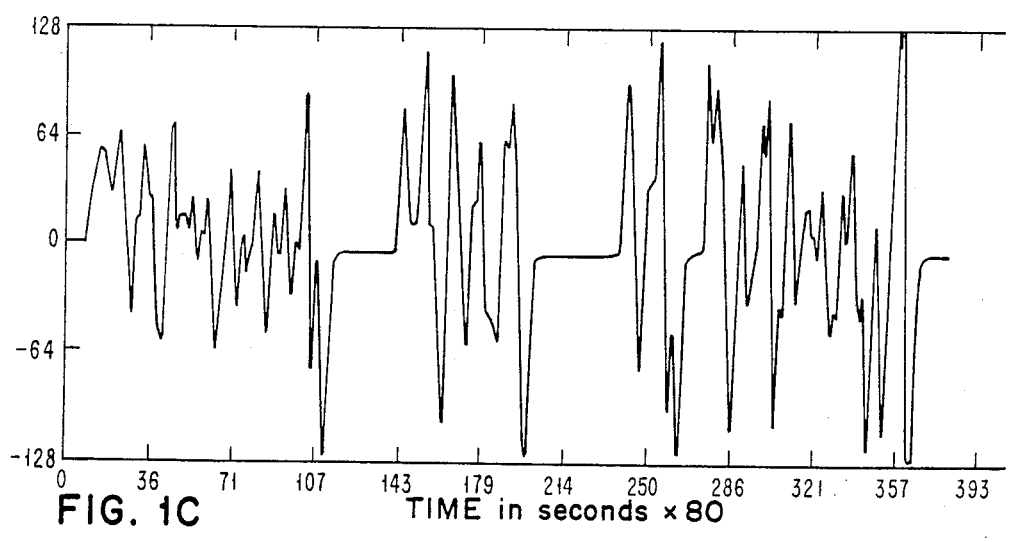

FIGS. 1A and 1B show measured X and Y acceleration data, while FIG. 1C shows measured first time derivative of the pressure. In FIG. 1C it will be observed that there are three obvious quiet regions which are indicative of pen lifts. The same would be true if FIG. 1C showed the pressure signal instead of the first time derivative. In either case, the measured pressure signal is analyzed according to U.S. Pat. No. 3,983,535 of Herbst et al or the measured first time derivative of the pressure is analyzed according to application Ser. No. 569,200 of Chainer et al to determine the actual occurrences of pen lifts in order to facilitate segmenting the acceleration and pressure signals. Then, according to the Herbst et al procedure, the acceleration signal segment pairs and the pressure signal segment pairs are individually shifted to achieve maximum correlation and, as will be appreciated from the complexity of the measured signals shown in FIGS. 1A to 1C, this involves a considerable amount of processing.

According to the present invention, only the pressure signal segments are shifted to find the maximum correlation between segment pairs. The amount of the shifts required to achieve the maximum correlation between each pressure signal segment pair are then used to shift the corresponding acceleration signal segment pairs. In other words, there is no independent shifting of the acceleration signal segment pairs to achieve maximum correlation between these pairs. Rather, it is assumed that the shifts required for the corresponding pressure signal segment pairs will produce the maximum correlation values for the acceleration signal segments. This assumption has been verified in practice.

Figure 2:
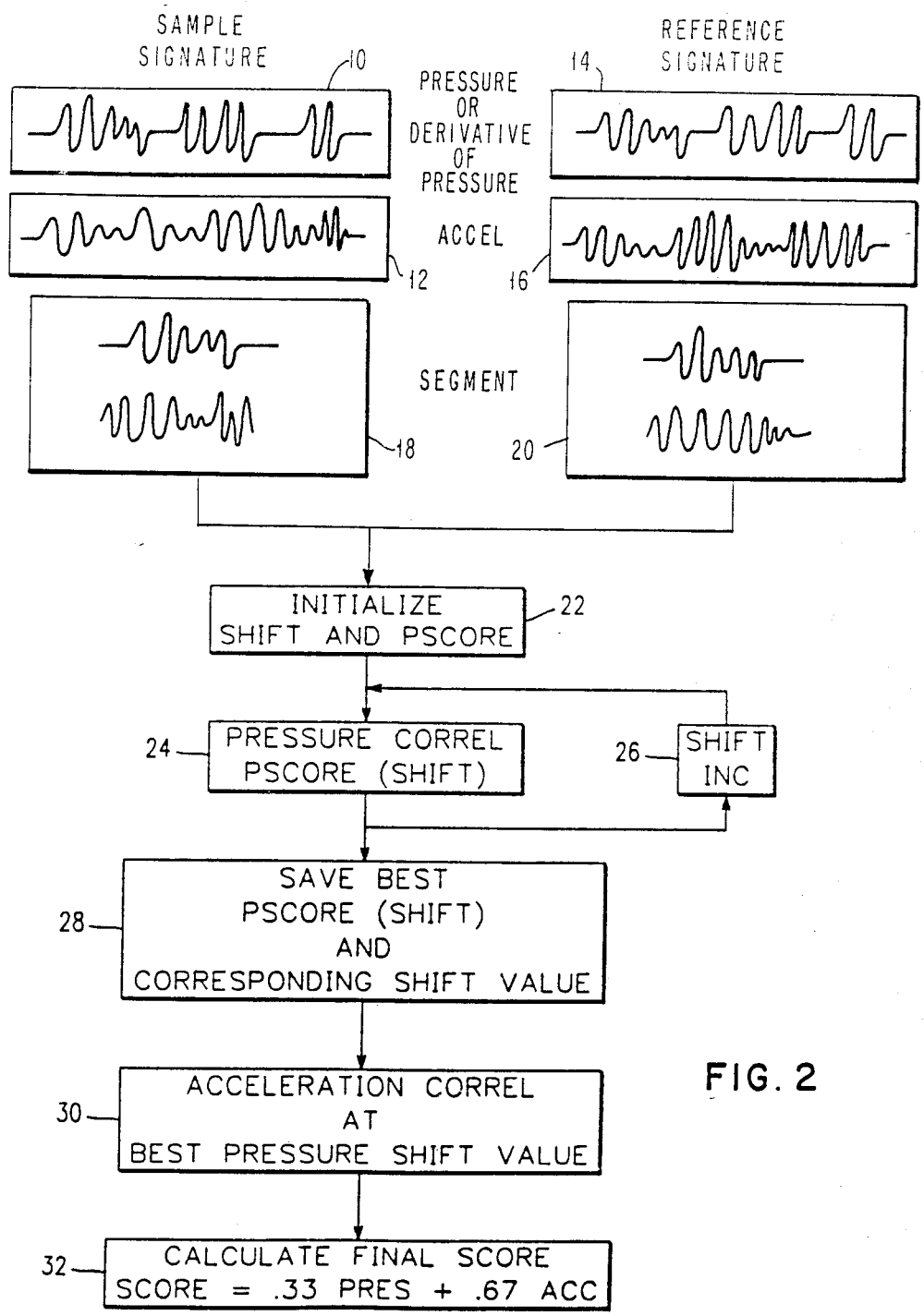
FIG. 2 is a flow chart illustrating the improved shifting technique according the invention.

The process according to the invention is illustrated by the flow chart shown in FIG. 2. The data to be analyzed are the same pressure signal or derivative of the pressure signal indicated by block 10 and at least one sample acceleration signal indicated by block 12. These are to be compared with reference data comprising a pressure signal or derivative of the pressure signal indicated by block 14 and at least one acceleration signal indicated by block 16. The reference data is typically stored in a computer data base and was originally input when a person enrolled in the system. The sample data is also stored in memory for the purpose of performing the verification analysis. As in the Herbst et al procedure, both the sample data and the reference data are segmented in order to facilitate the identification of regions of high correlation probability. This is indicated by blocks 18 and 20 respectively. Actually, the segmenting of the sample and reference data may not be performed contemporaneously as this tends to increase the processing time. Instead, the reference data may be stored in the data base in segmented form.

When segmented sample and reference data are ready for the process according to the invention, then the first step is to initialize both the shift counter and the P score register as indicated in block 22. Then the pressure correlation between the first corresponding pressure segment pairs is computed, the P score stored in the P score register with the corresponding shift count value, and the pressure segments of the pair are shifted relative to one another. This is indicated by block 24, and this process is repeated according to a predetermined pattern as indicated by block 26. During this process, the best P score and corresponding shift value are saved as indicated by block 28. This is done for each pair of pressure segments so that there is accumulated not only the best P scores for each pair, but also the shift values which produced those scores. Then these shift scores are used to perform the acceleration segment pair correlations. This is indicated in block 30. Since the members of the corresponding acceleration pairs are not individually shifted in order to find the maximum correlation values, the processing time is considerably reduced. The process is completed by computing the final score according to a predetermined formula based on the pressure and acceleration correlation values as indicated by block 32.

The process is implemented in a computer program written in Pascal. The program listings which follow are in two parts which bear the labels VERMOD and CORMOD. The listings are similar to the flow chart shown in FIG. 2. Comments for the listings are located within boxes.

```
SEGMENT VERMOD;

PROCEDURE Shift      (Reflen,Samlen:INTEGER;
                      Refx,Refy,Refz,Samx,Samy,Samz:segdata;
                      VAR Pmax,Amax:REAL;
                      VAR Olapp:INTEGER);EXTERNAL;

PROCEDURE Versub     ( Samsig,Refsig:signature);EXTERNAL;
```

> Verify Program
>
> Function: To compare two signatures
>
> 1) Samsig   Inp    Sample signature
> 2) Refsig   Inp    Reference signature

```
PROCEDURE VERSUB;

BEGIN (*VERSUB
```

> THE CORRELATION PROCESS BEGINS
> The signature is divided into segments and correlated by segment
> There are 'Nsegs' segments, and segment index is 'iseg'.

```
FOR iseg := 1 to Nsegs DO
   BEGIN
   j := 2 * iseg;
   n := 0;
   FOR k :=  Pensr (.j - 1.) TO Pensr (.j.) DO
      BEGIN
      n := n + 1;
      Refx (.n.) := Reflx (.k.);
      Refy (.n.) := Refly (.k.);
      Refz (.n.) := Reflz (.k.);
      END;
   Reflen := n;              number of points in REF seg
    n := 0;
   FOR k := Penss (.j - 1.) TO Penss (.j.) DO BEGIN
      n := n + 1;
      Samx (.n.) := Samlx (.k.);
      Samy (.n.) := Samly (.k.);
      Samz (.n.) := Samlz (.k.);
      END;
   samlen := n;              number of points in SAM seg
```

> Call shift to correlate the pressure data for a segment
> at a particular value of shift. The segments are shifted
> 15% to find the highest pressure correlation score. That
> shift value is used to calculate the acceleration correlation.

```
        Shift   (Reflen,Samlen,
                 Refx,Refy,Refz,Samx,Samy,Samz,
                 Pmax,Amax,Olapp);

Pscore := Pscore + pmax * olapp;
    Ascore := Ascore + amax * olapp;

END; of the segment loop
```

Normalize final pressure and correlation score by reference length 'lref'

```
Pscore := Pscore / float(lref);
Ascore := Ascore / float(lref);
```

Calculate the final score as a weighted avg of Ascore and Pscore

```
    Score := awt * Ascore + (1.0 - awt) * Pscore;
END;

SEGMENT Cormod;

PROCEDURE Pcorr (Refsh,Samsh,Len:INTEGER;
                Samz,Refz:segdata;
                VAR Pscorr:REAL);EXTERNAL;
```

```
PROCEDURE PCORR

Function: To calculate the pressure
            correlation score.

Type    'I/Q '  Val/Ref' Purpose
           -----------------------------------------------
    1)     Refsh    Inp      Ref     Reference segment offset
    2)     Samsh    Inp      Ref     Sample    segment offset
    3)     Len      Inp      Ref     No. pts in correlation
    4)     Samz     Inp      Ref     Sample   - z component
    5)     Refz     Inp      Ref     Reference - z component
    6)     Pscorr   Out      Ref     Pressure score
```

```
PROCEDURE Acorr   (ARefsh,ASamsh,Pshmax,Olapp:Integer;
                   Samx,Samy,Refx,Refy:segdata;
                   VAR Ascorr:Real);EXTERNAL;
```

PROCEDURE ACORR

Function: To calculate the acceleration
         correlation score.

| | Type | I/O | Purpose |
|---|---|---|---|
| 1) | Arefsh | Inp | Reference segment offset |
| 2) | Asamsh | Inp | Sample segment offset |
| 3) | Pshmax | Inp | Shift value for highest pscore |
| 4) | Olapp | Inp | No. pts in correlation |
| 5) | Samx | Inp | Sample - x component |
| 6) | Samy | Inp | Sample - y component |
| 7) | Refx | Inp | Reference - x component |
| 8) | Refy | Inp | Reference - y component |
| 9) | Ascorr | Out | Acceleration score |

PROCEDURE Shift ( Reflen,Samlen:INTEGER;
               Refx,Refy,Refz,Samx,Samy,Samz:segdata;
               VAR Pmax,Amax:REAL;
               VAR Olapp:INTEGER);EXTERNAL;

PROCEDURE SHIFT

Function: To calculate the number and values
         of the shifts required, and to call
         the pressure correlation routine to determine
         the shift values which produce the
         highest scores. The acceleration correlation
         is calculated at the highest pressure score

| | Type | 'I/O' | Val/Ref | Purpose |
|---|---|---|---|---|
| 1) | Reflen | Inp | | No. pts. in ref segment |
| 2) | Samlen | Inp | | No. pts. in sam segment |
| 3) | Refx | Inp | | Reference - x component |
| 4) | Refy | Inp | | Reference - y component |
| 5) | Refz | Inp | | Reference - z component |
| 6) | Samx | Inp | | Sample - x component |
| 7) | Samy | Inp | | Sample - y component |
| 8) | Samz | Inp | | Sample - z component |
| 9) | Pmax | Out | | Max score - pressure |
| 10) | Amax | Out | | Acceleration score at max press |
| 11) | Olapp | Out | | Overlap length - Prs (=Olapa) |

PROCEDURE SHIFT;

BEGIN (*SHIFT

> Determine the number of shifts (n) and create the values
> ( -n,...,-1,0,1,...n )

```
shlen := round(FLOAT(Max(Reflen,Samlen)) * Shiftpc);
dellen := samlen - reflen;
tauct := 2 * shlen + 1;
FOR i := 1 TO tauct DO tau (.i.) := i - 1 - shlen;
Pmax := -1.0;
```

> Determine the lower and upper bounds for the REF and SAM
> vectors. The data between these points will be the only
> ones involved in the correlations (this obviates the need
> for a separate padding routine and a lot of wasteful
> multiplications by zero)

```
FOR i := 1 TO tauct DO
  BEGIN
  lo := MAX(0,MIN(tau(.i.),Samlen-1));
  IF tau (.i.) < 0 THEN up := MIN(Samlen-1,MAX(Reflen+tau(.i.)-1,0))
                  ELSE up := MAX(0,MIN(Reflen+tau(.i.)-1,Samlen-1));
  Len := up - lo + 1;
  IF (lo - tau (.i.)) >= 0 THEN Refsh := lo - tau (.i.)
                           ELSE Refsh := tau (.i.) - 1;
  Samsh := lo;
```

> Call the pressure correlation routine

```
  Pcorr (Refsh,Samsh,Len,Samz,Refz,Pscorr);
```

> Save the shift values and the segment offset at the maxium value
> the pressure correlation score.

```
  IF Pscorr > Pmax THEN BEGIN
                        Arefsh := Refsh;
                        Asamsh := Samsh;
                        Pshmax := tau(.i.);
                        Pmax   := Pscorr;
                        Olapp  := Len;
                        END;
END;
```
end the i-loop > Calculate Acceleration Correlation at the shift value which
> maximixed the pressure correlation 'Pshmax'

```
  Acorr (Arefsh,Asamsh,Pshmax,Olapp,Samx,Samy,Refx,Refy,Ascorr);

END;
```

Not only is processing time saved with no significant loss in correlation accuracy, the present invention makes the signature verification system more resistant to forgeries. This results from the fact that the invention removes a degree of freedom which is not used by valid signers. Specifically, valid signers naturally keep their pressure and acceleration signals in synchronism, while forgers do not necessarily accomplish this. This advantage has been demonstrated by empirical data which is summarized by the following table wherein a Type I error is the rejection of a valid signature and a Type II error is the acceptance of a forgery:

| Type I Error Rate | Type II Error Rate | Shift Technique |
|---|---|---|
| 15% | 0.5% | Independent |
| 15% | 0.5% | Pressure Only |
| 23% | 0% | Independent |
| 17% | 0% | Pressure Only |

These results indicate that determining the shift on the basis of the pressure data only gives equal reject rate (Type I) to the independent method at the high end forgery rate of 0.5% (Type II) but is superior when a lower Type II error rate is required.

Thus, it will be appreciated from the foregoing description of the preferred embodiment of the invention that not only is the signature verification system made to be faster and less expensive, it is actually improved in performance as measured by error rates compared to the prior technique of independently shifting both pressure and acceleration signals in the correlation process.

Having thus described our invention, what we claim as new, and desire to secure by Letters Patent is:

1. In a signature verification process including the steps of obtaining acceleration data and pressure data related to a given signature and comparing said data with reference data previously obtained from an identified signer, the improvement which comprises a method of enhancing the correlation or representative segments of the acceleration data which includes the steps of
    performing correlations of respective segments of a reference pressure signal and a sample pressure signal by successively measuring the correlation as the two signals are shifted with respect to one another,
    storing the shift values which produce the maximum correlation between each pair of pressure signal segments, and
    using the stored shift values as the amount of shift of be utilized during subsequent correlations of respective pairs of the acceleration data.

2. The method according to claim 1 wherein the pressure data is directly proportional to a pressure signal measured at the stylus of a writing instrument when a person writes his or her signature.

3. A method according to claim 1 wherein the pressure data is proportional to the first time derivative of a pressure signal measured at the stylus of a writing instrument when a person writes his or her signature.

* * * * *